United States Patent [19]
Chappell et al.

[11] 3,941,984
[45] Mar. 2, 1976

[54] SATELLITE RADIO RANGING VELOCITY NAVIGATION

[75] Inventors: Peter Chappell, Dallas, Tex.; Burnette W. Hicks, Aberystwyth, Wales; Gerald M. Gilbert, Plano, Tex.

[73] Assignee: Texas Instruments Incorporated, Dallas, Tex.

[22] Filed: July 5, 1973

[21] Appl. No.: 376,481

[52] U.S. Cl.... 235/150.27; 343/100 ST; 343/112 S; 73/178 R; 343/103
[51] Int. Cl....... G06f 15/50; G06g 7/70; G06g 7/78
[58] Field of Search.................... 340/27 NA, 27 SS; 343/100 ST, 112 S, 103; 235/150.27, 150.26, 150.24; 73/178

[56] References Cited
UNITED STATES PATENTS

| | | | |
|---|---|---|---|
| 3,111,670 | 11/1963 | Gaudillere | 343/112 S |
| 3,630,079 | 12/1971 | Hughes | 73/178 R |

*Primary Examiner*—Maynard R. Wilbur
*Assistant Examiner*—T. M. Blum
*Attorney, Agent, or Firm*—Hal Levine; René E. Grossman; Leo N. Heiting

[57] ABSTRACT

In an integrated satellite navigation system where satellite fixes periodically establish the position of a ship plying a course within the range of a chain of radio ranging stations, ship velocities are accurately determined in the interval between satellite fixes to chart the course between fixes by establishing difference values between successive RF signal transit times for each of a plurality of radio ranging stations. A set of functions dependent upon the difference values for transit times related to each station is stored, retaining the most recent and discarding the most aged of the set. Velocity signals representative of the motion of the ship are then periodically generated by utilization of the sets of difference functions. Preferably, the sets of difference functions are modified to give the most recent members of each set the greater weight.

17 Claims, 6 Drawing Figures

SATELLITE RADIO RANGING VELOCITY NAVIGATION

This invention relates to marine navigation, and more particularly to use of ship velocity derived from shore based radio ranging signals to maintain the integrity of ship position between absolute position fixes derived from orbiting satellites.

In integrated marine navigation systems using satellite fixes, a major problem involves the lack of a reliable continuous position reference. For shallow water areas, doppler sonar is employed to aid in overcoming the problem. The present invention is directed to overcoming this problem for deep water areas where doppler sonar is not reliable.

Two types of navigation systems have been used in marine seismic surveying. A first system is a radio positioning system based upon measured transit times of RF signals to a receiver on a vessel from shore based stations of known locations. A second system is a self contained integrated satellite navigation system to which information is provided by six navy maintained polar-orbiting satellites as reference for absolute positioning where relative position integrity between absolute position fixes from the satellites has been maintained by a dead-reckoning system composed of a four-beam pulsed sonar doppler, a ship's gyro compass, and a highly stable timing system. The integration of the latter functions into a navigation system has been achieved by combining the data in a shipboard computer in a manner to enhance the qualities of the respective system elements.

Automatic integrated marine navigation based on satellite position fixes and dead-reckoning between fixes with doppler sonar velocities and gyro compass azimuth measurement has become an accepted tool for navigation in offshore seismic surveying. U.S. Pat. No. 3,630,079 describes a method and system available for Texas Instruments Incorporated of Dallas, Texas under the service mark GEONAV.

Such satellite navigation systems are of limited capability when viewed on a world-wide operational basis because doppler sonar's depth tracking capability is limited. Doppler sonar as thus employed provide a component of frequency from each of four sonar axes, fore, aft, port and starboard. The frequency of the transmitted sonar energy is employed to resolve the velocity components. Utilization of such sonar implemented systems is limited since the rate of change of the variables can assume large range of values which are valid and vary considerably depending upon the vessel's design and sea conditions. In depth of water over 150 fathoms, some other means of velocity determination is preferable to either doppler sonar energy which is reflected off the thermacline layer or to the E-M log readings described in U.S. Pat. No. 3,630,079. Neither of the foregoing can account for drift components due to ocean current.

The present invention is directed to utilization of an alternative means for determining velocity in the interval between satellite position fixes.

In accordance with the present invention, estimates of ship velocity are derived from an external radio ranging system such as Loran. Such velocities are used in place of sonar velocities in water deeper than 150 fathoms.

More particularly, a pair of values representative of latitude and longitude are periodically established from orbiting satellite radio transmissions to establish periodic positional fixes. A velocity dependent course is then determined beginning with the satellite fix by generating successive values representative of instantaneous ship velocity.

In a more specific aspect, functions dependent upon differences in lengths of successive radials from a plurality of Loran stations are determined periodically at a high rate and difference value functions are stored in a moving table to retain a predetermined number of most recent values. Velocity along the fore/aft line of the vessel and velocity along the starboard/port line of the vessel are then derived from values in the table at a lower rate and are applied by dead-reckoning means until the next estimates are available thereby to define a computed course for the ship.

Such an integrated satellite navigation system is employed where a ship plies a course within the range of a chain of radio ranging stations such as Loran stations. Difference values between successive RF signal transit times for each of a plurality of stations are established. For each such station, a set of functions dependent upon such difference values for transit times related to each station is stored. Each such set is updated with new difference values for each station. Periodically velocity signals representative of the motion of the ship are generated by a least mean squares utilization of the sets of difference function.

For a more complete understanding of the present invention and for further objects and advantages thereof, reference may now be had to the following description taken in conjunction with the accompanying drawings, in which.

An integrated marine navigation system found especially suitable for marine geophysical industry is known and available under the trademark GEONAV from Geophysical Service, Inc. of Dallas, Texas. This system is described in U.S. Pat. No. 3,630,079. It employs satellite position fixes obtained at intervals of about 1 ½ hours. It employs acoustic doppler means for providing velocity data in the interval between satellite fixes. The system has been found satisfactory and is preferred for operations where the water depth is less than about 150 fathoms. However, there are vast marine expanses between continents which are of interest from the standpoint of marine geophysics that involve water depths beyond 150 fathoms.

Chains of Loran stations have been installed along coastal areas on both sides of the Atlantic and Pacific Oceans for use for establishing position.

Satellite fixes established every 1 ½ hour in accordance with the system of U.S. Pat. No. 3,630,079 are accurate to within 45 meters RMS. A satellite as it moves emits a signal which, as received on the earth's surface, exhibits a doppler shift. The satellite fix is established by measuring the satellite frequency shift over a fixed period of time. When a receiver on a ship moves during the measurement of the satellite signal, the ship movement introduces another doppler shift. There is thus a vital need to establish velocity of the ship in order to eliminate the ambiquity in any satellite fix.

Figure 1:
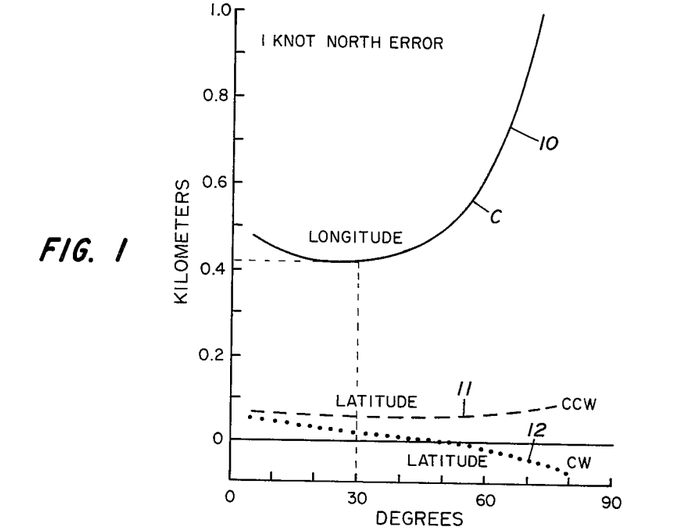
FIGS. 1 and 2 are graphs illustrating errors introduced in satellite position measurement as a function of ship velocity error.
Figure 2:
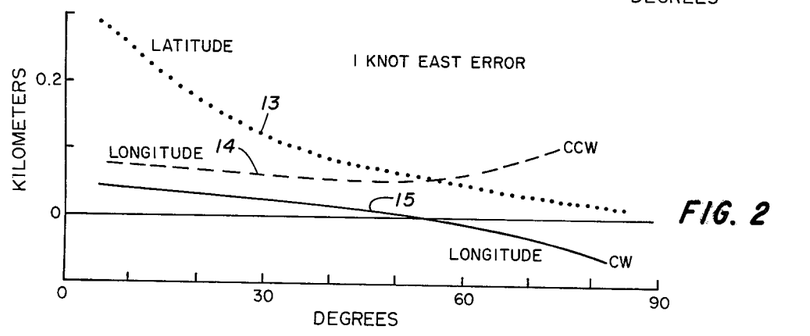

The foregoing problem is illustrated by FIGS. 1 and 2. FIGS. 1 and 2 are plots of experimental data wherein a week of satellite observations were recorded by the system employed in accordance with U.S. Pat. No. 3,630,079. Velocity data during such recordings was obtained from doppler sonar. The resulting satellite fixes were tabulated. A dead-reckoning or navigator's estimates were thereafter caused to have known velocity and heading errors. Satellite fixes were then recomputed and compared with previously tabulated data. The resultant data was then plotted. In FIG. 1 the velocity error employed in computing longitude and latitude was 1 knot north error. Similar data is plotted in FIG. 2 where the error velocity employed had 1 knot east error.

In FIG. 1 the errors, scaled in kilometers, are plotted as ordinates. The observed satellite elevation angle at the closest approach is plotted as abscissae. The resulting error curve 10 for longitude shows that if there is a 1 knot north error in velocity while tracking a satellite whose elevation angle is 30° at the closest approach, the position fix may be in error by as much as 425 meters. It is clear that the longitude error is the largest component of satellite fix error due to ship northerly velocity error. The smaller component, error in latitude, as shown by curves 11 and 12, tends to differ, depending on the orientation of the satellite observation in question. That is, the curves 11 and 12 differ depending on whether the satellite is moving clockwise or counterclockwise with respect to the point of observation.

In FIG. 2, curve 13 shows the error in latitude and curves 14 and 15 show errors in longitude as a function of the elevation angle at the closest approach. Thus, the positional errors are shown for 1 knot north velocity error in FIG. 1 and 1 knot east velocity error in FIG. 2 at latitude of 32° north. It is to be understood from the foregoing that major satellite fix errors are caused by dead-reckoning error.

The resolution in time measurement by a Loran C system is about 0.01 × 10⁻⁶ seconds/second. This is equal to about 6 knots. Needed is resolution to at least 0.05 knots. Thus, the present invention utilizes Loran signals in spite of poor resolution which characterizes the Loran normal mode, by modifying the Loran signal such that the desired resolution can be achieved.

Figure 3:
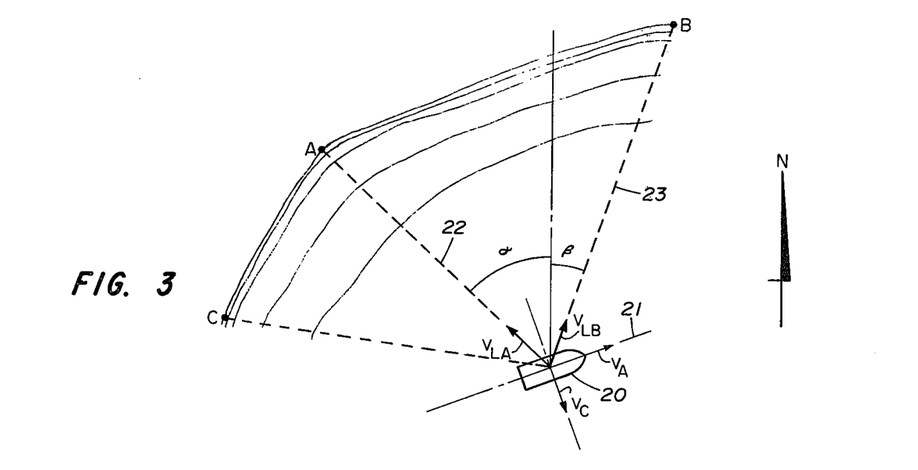
FIG. 3 illustrates the geometry of a typical marine navigation operation.

In FIG. 3, a typical system geometry embodying the invention has been illustrated. Loran stations A, B and C may be considered shore based stations with a ship 20 having its fore/aft axis 21 at any given heading. A radial 22 represents the distance from station A to ship 20. The radial 23 represents the distance from station B to ship 20. The legends employed in FIG. 3 are set out in Table I.

TABLE I

| SYMBOLS | |
|---|---|
| A | Loran station A |
| B | Loran station B |
| C | Loran station C |
| $V_A$ | Velocity along fore/aft line of vessel |
| $V_C$ | Velocity along starboard/port |

TABLE I-continued

| SYMBOLS | |
|---|---|
| $V_{LA}$ | line of vessel Velocity computed toward station A from rate of change of Loran readings |
| $V_{LB}$ | Velocity computed toward station B from rate of change of Loran readings |
| α | Azimuth of receiver to station A |
| β | Azimuth of receiver to station B |

Figure 4:
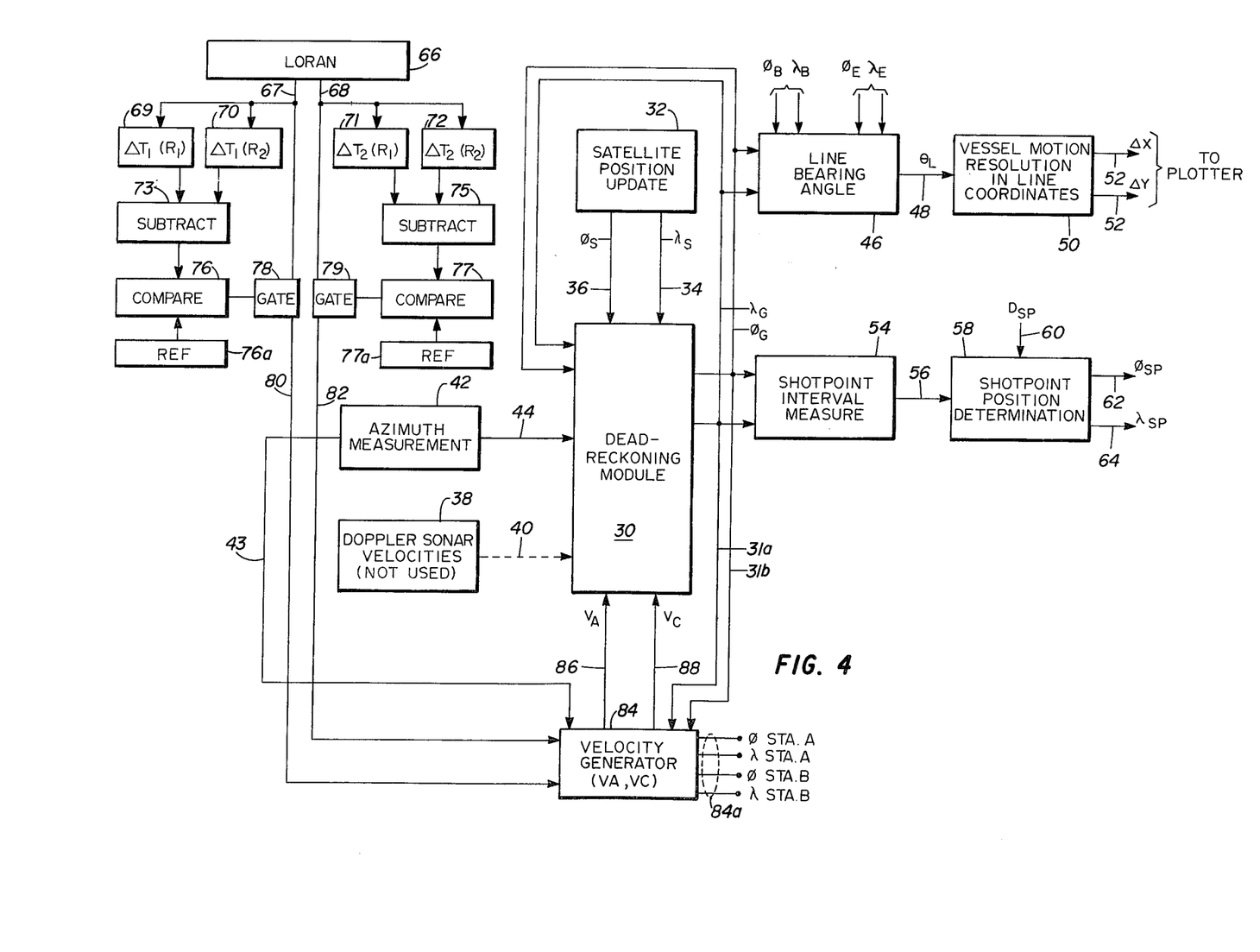
FIG. 4 illustrates an integrated satellite-Loran shipborne navigation unit.

In accordance with U.S. Pat. No. 3,630,079, the velocity vectors $V_A$, $V_C$ are determined in the operation based upon shipborne doppler sonar. FIG. 4 illustrates such a system. Unit 30 is a dead-reckoning module having inputs from a satellite position update receiver 32 which provides by way of channel 34 a satellite longitude ($\mu_S$) value and a satellite latitude ($\phi_S$) value by way of channel 36. The system of the prior art then employs a doppler sonar unit 38, not used with the present invention, to provide ship velocities in shallow areas. Channel 40 from unit 38 leads to module 30. Ship azimuth measurements are made by a gyro unit 42 and such information is applied to module 30 by way of channel 44. The system operates to determine the line bearing angle in unit 46 to which two sets of input signals are applied in accordance with Table II to provide the line bearing angle $\theta_L$ as applied by way of channel 48 to a unit 50 which provides outputs 52 to a course plotter indicative of vessel motion relative to a prescribed seismic line.

TABLE II

| SYMBOLS | | SUFFIX | |
|---|---|---|---|
| D | Shotpoint interval | A | Alongtrack component |
| $T_1$ | LORAN time-difference | B | Beginning of line |
| $T_2$ | readings | C | Crosstrack component |
| φ | Latitude | E | End of line |
| λ | Longitude | L | LORAN |
| θ | Line-bearing angle | S | Satellite |
| | | SP | Shotpoint |
| | | G | GEONAV System |

In order to assist in understanding the use to which the invention may be put, it is here noted that unit 30 may apply latitude and longitude signals to a seismic shot point interval measuring unit 54 whose output may then be applied by way of channel 56 to a shot point position determination unit 58. A second input to unit 58 by way of channel 60 may provide the shot point interval $D_{SP}$. Outputs of latitude and longitude on channels 62 and 64 may then be provided for each shot point location.

In such an application, the foregoing system is detailed in structure and operation in U.S. Pat. No. 3,630,079 and will not be further detailed here.

In accordance with the present invention, velocity data is generated and supplied to unit 30 in place of the doppler sonar velocities which are employed in shallow areas. More particularly, a Loran receiver unit 66 is connected by way of channels 67 to registers 69 and 70. Loran unit 66 is also connected by way of channels 68 to registers 71 and 72. Registers 69 and 70 are connected to a subtraction unit 73. Registers 71 and 72 are connected to a subtraction unit 75. Subtraction unit 73 is connected to one input of a comparator 76. Subtraction unit 75 is connected to one input of comparator 77. The second input to comparator 76 is supplied from a reference unit 76a. The second input of comparator 77 is supplied from reference unit 77a. Comparator 76 is connected to control a gate 78 in line 80 leading to generator 84. Comparator 77 is connected to control a gate 79 in line 82 leading to generator 84.

In operation, the Loran unit 66 provides on lines 67 a time interval measurement signal representative of the R.F. travel time to the mobile station on ship 20 from station A. Similarly, on line 68 the transit time over path 23 from station B is available. Registers 69 and 70 are actuated to store alternate signals representative of the transit time on line 67 with new signals replacing the signals in register 69 and the next one replacing the signal in register 70 and thereafter alternating the signals. Thus, the two most recent measurements representing the length of path 22 all are maintained in registers 69 and 70. These two signals are subtracted one from the other in unit 73. The difference signal is then applied to comparator 76 wherein it is compared with a reference signal. If the change in velocity represented by a difference in time of the signals stored in registers 69 and 70 exceed a preset level set in reference unit 76a, then gate 78 will not permit the most recent signal on line 67 to pass. However, if the change in velocity is within acceptable limits, then gate 78 will pass the most recent signal of transit time by way of channel 80 to the generator 84. In a similar manner, the two most recent signals representing travel time to station B are maintained in registers 71 and 72. These signals are subtracted one from the other and if the difference as sensed by comparator 77 with reference to the reference level in unit 77a does not exceed a predetermined limit, then gate 79 passes the most recent signal to the velocity generator 84.

Basically, the time differences are examined for noisy signal reception which would be indicated by too great a change between successive signals of the transit times as stored in registers 69 and 70. For example, a time difference of ±0.05 microsecond per second is equivalent to approximately ±30 knots toward or away from the respective base station. It is known that such a change could be due only to a noisy signal and not to an actual change in the ship direction or velocity. Therefore, because of the physical limitations involved, if the time difference in the signal from the subtraction unit 73 exceeds ±0.05, then gate 78 will not transmit signals. Rather than apply a time difference signal $\Delta T_1$ etc. to generator 84, a signal is applied to indicate that the reading for that sample is no good.

Velocity generator 84 has two output channels 86 and 88 which apply velocities $V_A$ and $V_C$ to unit 30. The velocities $V_A$ and $V_C$ are illustrated in FIG. 3 and are identified by the code set out in Tables I and II.

An azimuth measuring unit 42 provides an output representative of the heading angle of the ship relative to north as shown in FIG. 3. This output is connected to generator 84 by way of line 43. The longitude and latitude of the ship 20 $\mu_G$ and $\phi_G$ periodically available from satellite fixes are applied to the generator 84 by way of channels 31a and 31b. Known longitudes and latitudes of the stations A and B ($\mu$-sta. A; $\mu$-sta. B, $\phi$-sta. A and $\phi$-sta. B) are also applied as inputs to unit 84 on lines 84a. The signals on lines 31a, 31b, 43 and 84a are employed in elementary processing to determine the azimuth from the ship 20, FIG. 3, to stations A and B, i.e., to determine angles $\alpha$ and $\beta$ of FIG. 3.

As above noted, Loran measurements in general have resolution two orders of magnitude less than is necessary to be employed in the operations depicted in FIGS. 3 and 4. In accordance with the present invention, a system and method are employed for modifying the successive signals on channels 80 and 82 to produce radio ranging dependent velocity signals $V_A$ and $V_C$ on channels 86 and 88 of the necessary resolution to yield accurate positioning in water depths exceeding depths within the capability of the system employing doppler sonar. Errors inherent in Loran may then be minimized by utilizing a continuous absolute check on its operation by satellite fixes which are independent of time-reference drift, signal-path errors, and skywave effects. With satellite fixes, the system provides absolute final post process positions referenced to the satellite.

The Loran unit 66, FIG. 4, samples the transit times of signals from base stations A and B, FIG. 3, each second. On the basis of such measurements, new values of the velocity vectors $V_A$ and $V_C$ are generated every four seconds, giving continuous accurate navigation update to the integrated output coordinates from the system. The velocity values are computed from the rate of change dependent upon the Loran transit times and not from absolute positioning from Loran range readings. Because of this, the navigation system is independent of Loran calibration.

In Loran system 66, transit times are represented by the differences in counts of pulses from a timing standard in gating intervals determined by Loran operation. Inasmuch as the transit time updates become somewhat erratic in their own up or down counts due to noisy signal reception, particularly at long ranges from the base stations A and B, FIG. 3, filters in unit 84 smooth the generated velocities giving a more accurate determination of the vessel's actual motion.

As above noted, Loran station data representing latitude and longitude are applied as inputs to generator 84 by way of channels 84a. Azimuth in terms of ship heading from unit 42 is input to generator 84 by way of channel 43. Transit times in microseconds from stations to the receiver for the tracking of two or possibly all three of the stations A, B and C, FIG. 3, are applied by way of channels 80 and 82. The transfer of Loran transit time data occurs each second. Generator 84 operates basically at a 4 second rate.

Figure 5:
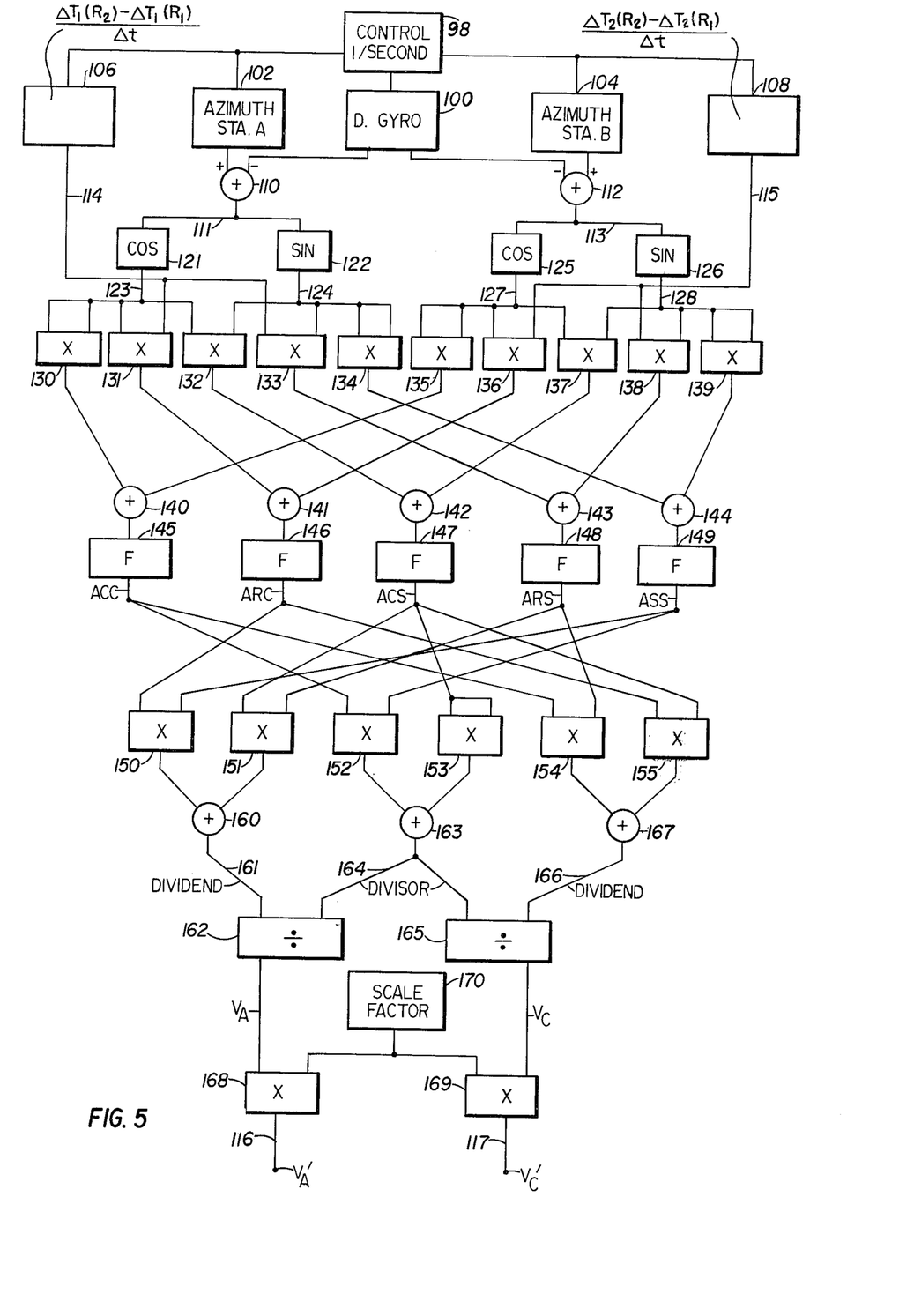
FIG. 5 illustrates a structure of an embodiment of the velocity generator of FIG. 4.

FIG. 5 shows in detail one embodiment of the velocity generator 84, FIG. 4.

The input signals to generator 84 above noted are provided by five units under control of a clock unit 98. In this embodiment one sample is taken each second. The first input unit is a directional gyro 100. Signals on lines 31a, 31b and 84a provide a second signal representative of the azimuth between ship 20, FIG. 3, and station A. Unit 104 provides a signal representative of the azimuth between ship 20 and station B. Unit 106 provides a signal $[\Delta T_1 (R_2) - \Delta T_1 (R_1)] / \Delta t$ where $\Delta T_1 (R_1)$ and $\Delta T_1 (R_2)$ are consecutive samples of the time interval measurement signal from station A, and $\Delta t$ is the sample interval in unit 66, FIG. 4. Similarly, a fifth unit 108 provides a signal $[\Delta T_2 (R_2) - \Delta T_2 (R_1)] / \Delta t$.

The signals from unit 100 and unit 102 are applied to a summation unit 110 such that on line 111 there appears a signal representative of angle $\alpha$, FIG. 3. The signals from gyro 100 and unit 104 are applied to the unit 112 so that there appears on line 113 a signal representative of the angle $\beta$, FIG. 3. The system then employs signals on lines 111, 113, 114 and 115 to produce on output lines 116 and 117 signals representative of the velocity $V_A$ and $V_C$.

More particularly, units 121 and 122 produce on lines 123 and 124, respectively, signals representative of the cosine and the sine of the bearing to station A. Units 125 and 126 produce on lines 127 and 128, respectively, signals representative of the cosine and sine of the bearing to station B. These signals are then selectively applied to multiplier units 130–139 along with signals from lines 114 and 115. From the connections to the various inputs of units 130–139 it will be seen that the output signals are as follows:

Unit 130: $cos^2$ of the bearing to station A;
Unit 131: the product of cos of the bearing to station A multiplied by $[\Delta T_1(R_2) - \Delta T_1(R_1)]/\Delta t$;
Unit 132: product of cos and sin of the bearing to station A;
Unit 133: product of the sin of the bearing of station A and $[\Delta T_1(R_2) - \Delta T_1(R_1)]/\Delta t$;
Unit 134: $sin^2$ of the bearing to station A;
Unit 135: $cos^2$ of the bearing to station B;
Unit 136: the product of the cos of the bearing to station B and $[\Delta T_2(R_2) - \Delta T_2(R_1)]/\Delta t$;
Unit 137: the product of sin and cos of the bearing to station B;
Unit 138: the product of the sin of the bearing to station B $\times [\Delta T_2(R_2) - \Delta T_2(R_1)]/\Delta t$; and
Unit 139: $sin^2$ of the bearing to station B.

The outputs of units 130 and 135 are summed in the adder 140; the outputs of units 131 and 136 are summed in adder 141; the outputs of units 132 and 137 are summed in adder 142; the outputs of units 133 and 138 are summed in adder 143; and the outputs of units 134 and 139 are summed in adder 144.

Multi-element filters 145–149 are connected to the outputs of adders 140–144, respectively, to provide, in the embodiment in the invention here being described, a forty point smoothing unit the details of which will be further explained in connection with FIG. 6.

The outputs of filters 145–149 are then applied selectively to multipliers 150–155. More particularly, multiplier 150 has as inputs the outputs of filters 146 and 149; multiplier 151 has as inputs the outputs of filters 147 and 148; the inputs of multiplier 152 are connected to the outputs of filters 145 and 149; the inputs of multiplier 153 are connected to the output of filter 147; the inputs to multiplier 154 are connected to the outputs of filter 145 and filter 148; and the inputs to multiplier 155 are connected to the outputs of filters 146 and 147.

The outputs of multipliers 150 and 151 are applied to a summing unit 160 to provide an output on line 161 which is a dividend signal applied to a divider unit 162. The outputs of multipliers 152 and 153 are applied to a summing unit 163 to provide on line 164 a signal representative of a divisor which is applied to both divider unit 162 and a second divider unit 165. The dividend input signal to unit 165 as it appears on line 166 is produced by summing the outputs of multipliers 154 and 155 in adder 167.

The outputs of dividers 162 and 165 are then applied to multipliers 168 and 169 along with a scale factor signal from unit 170 to provide the output signals $V_A$ and $V_C$ on lines 116 and 117.

The system of FIG. 5 serves to process a plurality of samples of the transit times represented by the counts from units 106 and 108 to provide velocity data of resolution far greater than otherwise is possible. This is made possible by incorporating filters 145–149 in the system of FIG. 5.

It will be seen that functions which are dependent upon forty successive time differences are stored in filters 145–149 in tables with one set of tables provided for each station. On the basis of such tables, velocity values are derived for $V_A$ and $V_C$ every fourth second. The velocities are applied to the dead-reckoning unit 30 for 4 seconds while the next velocity signals are being generated. During velocity signal generation, the processor of FIG. 5 weights the table functions. The most recent data will be more heavily weighted than the older data thereby causing the current computed velocity to more accurately represent the most recent motion of the ship. Use of weighting factors reduces the possibility of one erroneous reading in a table resulting from a noisy signal reception affecting velocity computations for a full 40 seconds.

The velocities are effectively rotated by use of adders 110 and 112, FIG. 5, using the ship's heading derived from the gyro compass input so that the velocity components in the fore/aft and port/starboard coordinates $V_A$ and $V_C$ are generated. These velocities may then be applied to unit 30 in the same way as are the $D_A$ and $D_C$ values from the doppler sonar in the normal bottom tracking operation of U.S. Pat. No. 3,630,079.

To compute velocities from the rate of change of Loran transit times, a value for the velocity of signal propagation is assumed. This assumed value of velocity of propagation is 300,000 kilometers/second. This velocity is not constant and will depend on the area of operation and associated climatic conditions. A constant is employed to account for variation in the velocity of propagation along the course of the ship in the intervals between satellite fixes. The constant is selected by an operator to cause Loran based velocity fixes to correspond with the periodic satellite fixes.

Following the velocity generation, both the $V_A$ and $V_C$ values are checked in unit 30 with respect to ±18.0 knots and velocities exceeding this level are not employed to the dead-reckoning determinations.

Since data from three stations can be accommodated and only two ranges are necessary to compute velocities, the system may ignore one station, either A, B or C; or alternatively, the data of all three stations can be used to generate the velocities.

Generation of velocities $V_A$ and $V_C$ from the Loran readings is based on their rate of change and are not actual transit time measurements. Therefore, the Loran receiver need not be calibrated to satellite fixes prior to operation. Also, the rate of change during 1 second depends only on the propagation constants for the signals in the immediate vicinity of the receiving antenna; this makes the system independent of land path propagation constants changes for the Loran signals. Should a Loran C signal being tracked jump to the second or fourth cycle or should either Loran A or Loran C start tracking a sky wave, only the transit time to the receiver from the base station will be affected, not the rate of change at the receiver. Consequently, the noise check routine will discard the particular sample or samples involved in the jump, but the velocities computed will still be reliable for subsequent samples.

The present system does not resolve the problem of frequency standard drift. Such drift can superimpose an induced velocity on the actual velocities of the receiver. An initial calibration period during which the Loran receiver frequency standard is compared to the base stations' standard drift may be employed to minimize this problem. In the normal Loran installations, the transmitting standards of the various slave stations of a particular chain are locked to the master station's standard to preserve synchronization. In such case, the receiver standard need only be flattened out against the one common drift. With the present system, however, drift compensation need not be as precise as it would be if the Loran system were being used as the primary navigation system; with small drift mismatches between the transmitters and the receiver, the percentage of the drift induced velocity as compared with the actual receiver velocity is very small between 1 second samples.

Figure 6:
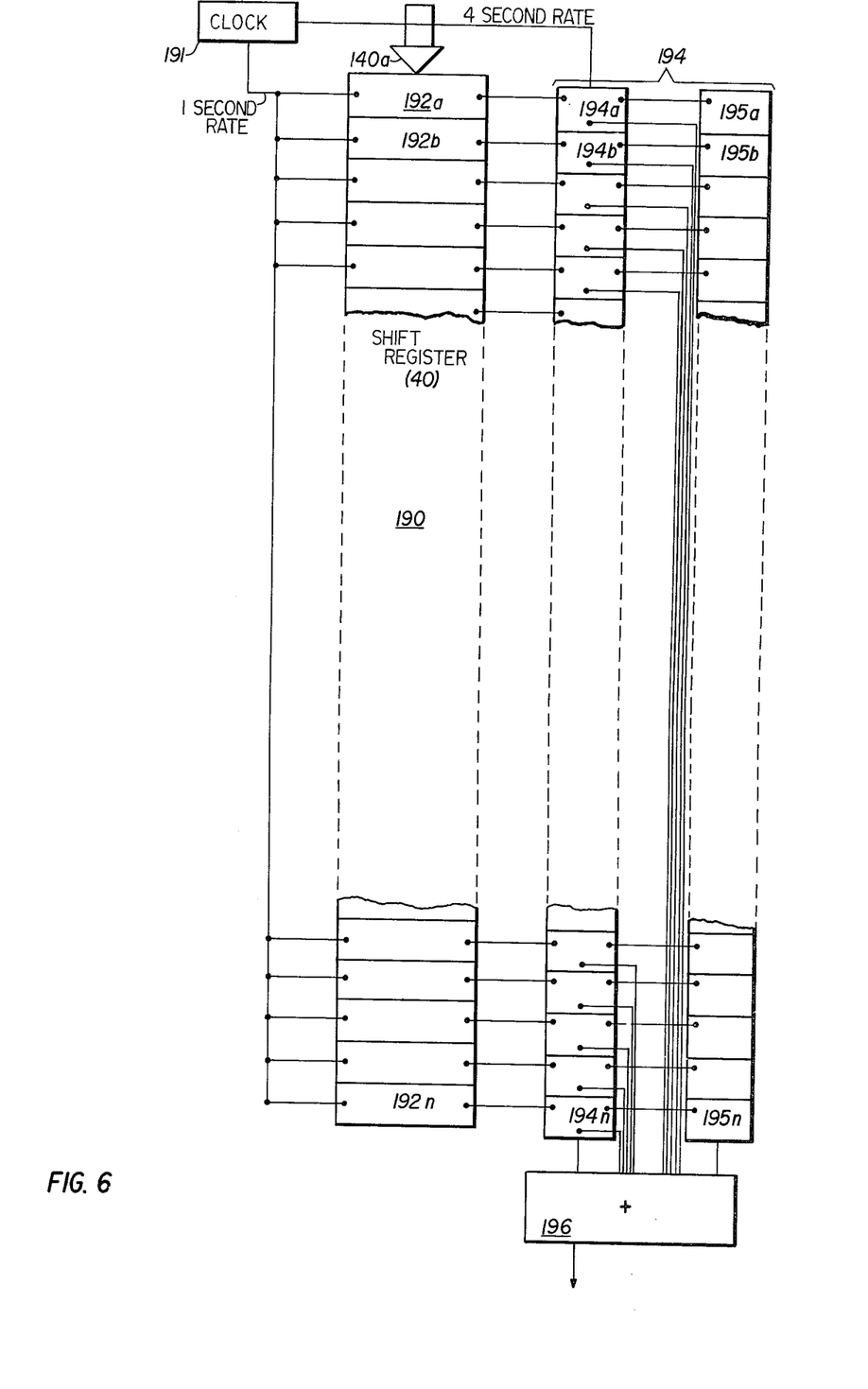
FIG. 6 illustrates an embodiment of a moving table and a tapered summing unit employed in the system of FIG. 5.

A typical representation of a suitable filter (145–149) is shown in FIG. 6. The output signals, such as from unit 140, FIG. 5, appear on channel 140a, FIG. 6. Such signals may be in a binary code representing the levels of the signals from summation unit 140. This signal is then applied to the first stage 192a of a shift register 190. A clock pulse source 191 is coupled to shift register 190 to shift the contents down through the register in synchronization with the one second sampling of the signal $[\Delta T_1(R_2) - \Delta T_1(R_1)]/\Delta t$ as it appears at the output of unit 106, FIG. 5. During an initial start up interval of 40 seconds, the shift register 190 is loaded. The most recent count dependent signal is stored in the first register 192a and the signal representative of a count 40 seconds old will be found in the last register 192n. Every 4 seconds, a tapered or weighted adder 194 is actuated to provide a weighted sum of all of the signals stored in shift register 190. The most recent sample as stored in register 192a is applied to adder 196 with full weight. The oldest of the samples, as stored in unit 192n, is given the least weight. In the preferred embodiment of the invention, the weighting taper is linear with the most recent being of maximum value and the oldest being of minimum value.

The tapered adder 194 may comprise a bank of multipliers 194a–194n, a bank of weighting registers 195a–195n and a summing unit 196. Register 192a is connected to the top unit 194a in the multiplier bank. The second input to multiplier unit 194a is supplied from weighting register 195a.

The second multiplier unit 194b is connected at one input to the second register 192b and at the second input to a preset register 195b. Similarly, the last multiplier unit 195n is connected at one input to register 192n and at the other input to a preset register 195n. The outputs of all the multipliers 194a–194n are connected as inputs to the summing unit 196. The output of summing input 196 could be divided by a factor equal to the number n. However, since both inputs to both of units 162 and 165, FIG. 5, involve sum signals such as appear at the output of unit 196, FIG. 6, there is no need to reduce the magnitudes of the latter signals by a factor n. Weighting registers 195a, 195b and 195n may have values set therein in accordance with the desired taper of the signals to be applied to adder 196. For example, the multiplier value in register 195 may be 1.000. The multiplier value in unit 195n may be 0.075. The intermediate values may be scaled linearly between the value 1.000 and 0.075 so that the signals applied to the summing unit 196 would be linearly tapered. Different configurations of the taper may be adopted as might be desired. However, in the embodiment heretofore employed, the taper was linear.

The propriety of use of the system thus far described may be verified by a mathematical analysis as follows. Velocities $V_A$ and $V_C$ are generated from base station to receiver transit times as inputs. Transit times from stations A and B are designated as $\Delta T_1$ and $\Delta T_2$, respectively. The signals $\Delta T_3$ from a third station C also are contemplated in the following analysis.

At any instant in time, the range rate of a LORAN base station to a receiver $R_i$ can be expressed as $$R_i = V_N \cos \alpha_i + V_E \sin \alpha_i \tag{1}$$

where
 $V_N$ is the instantaneous velocity component in a northerly direction
 $V_E$ is the instantaneous velocity component in an easterly direction
 $\alpha_i$ is the bearing of the $i^{th}$ base station from the receiver The velocity components $V_N$ and $V_E$ can be expressed in terms of components along the vessel's fore/aft line $V_A$ and the starboard/port line $V_C$ as $$V_N = V_A \cos \theta - V_C \sin \theta \tag{2}$$

$$V_E = V_A \sin \theta + V_C \cos \theta \tag{3}$$

where $\theta$ is the vessel's instantaneous azimuth. Thus, substituting Equations 2 and 3 into Equation 1, $$R_i = (V_A \cos \theta - V_C \sin \theta) \cos \alpha_i + (V_A \sin \theta + V_C \cos \theta) \sin \alpha_i \tag{4}$$

To compute the least-mean-square function L of range values from three stations ($i = 1 - 3$) of 40 1-sec samples for each station ($k = 1 - 40$), the following function is constructed from Equation 4:

$$L = \frac{1}{2} \sum_{K=1}^{40} \sum_{i=1}^{3} [(V_A \cos \theta_K - V_C \sin \theta_K) \cos \alpha_i \tag{5}$$

$$+ (V_A \sin \theta_K + V_C \cos \theta_K) \sin \alpha_i - R_K{}^i]^2$$

To give higher weighting to more recent data in the 40-sec station tables, one applies a weighting factor to Equation 5:

$$L = \frac{1}{2} \sum_{K=1}^{40} W_K \sum_{i=1}^{3} [(V_A \cos \theta_K - V_C \sin \theta_K) \cos \alpha_i \tag{6}$$

$$+ (V_A \sin \theta_K + V_C \cos \theta_K) \sin \alpha_i - R_K{}^i]^2$$

Rearranging Equation 6, $$L = \frac{1}{2} \sum_{K=1}^{40} W_K \sum_{i=1}^{3} [V_A (\cos \theta_K \cos \alpha_i + \sin \theta_K \sin \alpha_i) \tag{7}$$

$$+ V_C (\sin \alpha_i \cos \theta_K - \cos \alpha_i \sin \theta_K) - R_K{}^i]^2$$

$$= \frac{1}{2} \sum_{K=1}^{40} W_K \sum_{i=1}^{3} [V_A \cos (\alpha_i - \theta_K)$$

$$+ V_C \sin (\alpha_i - \theta_K) - R_K{}^i]^2$$

To produce the least-mean-square matrix, let $$C_K^i = \cos(\alpha_i - \theta_K)$$

$$S_K^i = \sin(\alpha_i - \theta_K)$$

$$\gamma = \frac{dL}{dV_A}$$

Thus, $$\gamma = \sum_{K=1}^{40} W_K \sum_{i=1}^{3} (V_A C_K^i + V_C S_K^i - R_K^i) C_K^i \qquad (8)$$

Rearranging Equation 8 and setting $\gamma = 0$, $$V_A \sum_{K=1}^{40} \sum_{i=1}^{3} {C_K^i}^2 W_K + V_C \sum_{K=1}^{40} \sum_{i=1}^{3} C_K^i S_K^i W_K \qquad (9)$$
$$= \sum_{K=1}^{40} \sum_{i=1}^{3} R_K^i C_K^i W_K$$

Equation 9 becomes $$V_A A_{CC} + V_C A_{CS} = A_{RC} \qquad (10)$$

where $$A_{CC} = \sum_{K=1}^{40} \sum_{i=1}^{3} {C_K^i}^2 W_K$$

$$A_{CS} = \sum_{K=1}^{40} \sum_{i=1}^{3} C_K^i S_K^i W_K$$

$$A_{RC} = \sum_{K=1}^{40} \sum_{i=1}^{3} R_K^i C_K^i W_K$$

Similarly, for $V_c$, letting $\gamma = dL/dV_C = 0$, $$V_A A_{CS} + V_C A_{SS} = A_{RS} \qquad (11)$$

where $$A_{SS} = \sum_{K=1}^{40} \sum_{i=1}^{3} {S_K^i}^2 W_K$$

$$A_{RS} = \sum_{K=1}^{40} \sum_{i=1}^{3} R_K^i S_K^i W_K$$

Determinant $\Delta$ of the least-mean-square matrix is given by $$\Delta = A_{CC} \cdot A_{SS} - A_{SC}^2 \qquad (12)$$

Thus, $$V_A = (A_{RC} \cdot A_{SS} - A_{RS} \cdot A_{CS})/\Delta \qquad (13)$$

$$V_C = (A_{RS} \cdot A_{CC} - A_{RC} \cdot A_{CS})/\Delta \qquad (14)$$

Equations 13 and 14 are in units of data counts per second. To convert these to velocities in centiknots per second, one multiplies by the velocity of propagation $K_V$; to allow for the calibration factor, one multiplies by $K_{LO}$. Thus, true unsmoothed velocities are as follows:

$$V_A' = V_A K_V K_{LO} \qquad (15)$$

$$V_C' = V_C K_V K_{LO} \qquad (16)$$

The multiplications represented by equations (15) and (16) are performed in blocks 168 and 169 in FIG. 5, and the quantity $K_v * K_{to}$ is generated by scale factor block 170 of FIG. 5. These unsmoothed velocity samples $V_A'$ and $V_C'$, given by Equations 15 and 16, are applied to the dead-reckoning module 30.

The factors of Equation (10), namely $A_{CC}$, $A_{CS}$ and $A_{RC}$ are labeled in FIG. 5 as the signals at the outputs of filters 145, 147 and 146, respectively. The factors $A_{SS}$ and $A_{RS}$ of Equation (11) are also labeled in FIG. 5 as the signal outputs of filters 149 and 148, respectively. The determinant of Equation (12) describes the signal output of adder 163. The numerator of Equation (13) describes the signal output of adder 160. The numerator of Equation (14) describes the signal output of adder 167. The velocity functions $V_A$ and $V_C$ are represented by the signals on the output lines from dividing units 162 and 165, respectively.

As above noted, the time difference signals represented by the signals on lines 114 and 115 of FIG. 5 are taken at one second intervals as determined by the output of clock 191, FIG. 6. In contrast, the velocity signals are generated and employed at a lower rate such as every four seconds.

FIGS. 5 and 6 illustrate the system in a general form. It is to be understood that the determination of velocities in unit 84 of FIG. 4 preferably will be carried out digitally. In such case, a special purpose computer may be employed or a general purpose computer may be employed. Further, the system can be carried out in an analog manner if desired. Economy of hardware and ease in changes in the modes of operation however, dictate preference for the digital form as the best mode for carrying out the present invention.

The Loran system 66 may be of the type identified as Austron Model 5000 Loran-C Navigation System manufactured by Austron Inc., Austin, Texas and leased by Offshore Navigation, Inc., New Orleans, Louisiana.

The gyro compass 100, FIG. 5, may be of the type described in U.S. Pat. No. 3,630,079. It provides continuous indications of heading of the vessel as utilized in FIG. 4 and FIG. 5 for determination of velocity.

Azimuth to station A and azimuth to station B as generated in units 102 and 104, respectively, of FIG. 5 is in U.S. Pat. No. 3,630,079.

In the embodiment of the invention wherein a general purpose digital computer was employed in unit 30, FIG. 4, the computer was of the type manufactured by Texas Instruments Incorporated of Dallas, Texas and identified as TI-2540 Computer. It is also known by a Navy designation CP-967(V)12/UYK. This computer is described in Handbook No. HB31-AT2-4 published by Texas Instruments Incorporated, Digital Systems Division of Dallas, Texas. In such handbook, the assembly language and the machine code language are both disclosed.

Program listings for carrying out the invention are set out in Table III In which the headings are as follows:
Column "LOCN" identifies the locations in core;
Column "object code" is expressed in machine language;
The "card" column sets out the card numbers;
Columns 1–5 set out the references; and
Columns 10–30 are expressed in assembly language.

3,941,984

TABLE III

```
LORAN3R      LORAN-A/C VELOCITY MODULE                                    72/249 11:38:58

LOCN    OBJECT CODE   CARD   1...5...10...15...20...25...30...35...40...45...50...55...60...65...70...
                         1              IDT    LORAN3R       LORAN-A/C VELOCITY MODULE
                         2        .
                         3        .    PROCESS LORAN A/C DATA EACH SECOND TO ESTIMATE VELOCITY ALONG
                         4        .
                         5        .    TRACK (VA) AND VELOCITY ACROSS TRACK (VC).  DATA IS SIX BCD HALF-
                         6        .
                         7        .    WORDS READ FROM P-BUS AT ADDRESS 3949.  P-BUS OUTPUT AT ADDRESS
                         8        .
                         9        .    38E9 MUST BE GIVEN AT LEAST 50 MS. BEFORE DATA IS READ.
                        10        .
                        11        .
                        12              ENT    LORAN3EG,LORANKEY,LORANDS,LORANCC
                        13              ENT    LORANVEL,LORANFAC,LORANINH,CIRCFLAG
                        14        .
                        15              EXT    DAMASKE,TTYIO,LILALO,DHI
                        16              EXT    COSGYRO,SINGYRO,LAT,LON
                        17              EXT    ERPCP,SYSBD,OSNO,OSYES,DHADD,DHSUB,OAPRNSET
                        18        .
                        19        .
 0006                   20       NS2     EQU    6                       2 * NUMBER OF STATIONS
                        21        .
 0028                   22       TABLEN  EQU    40                      LENGTH OF L. S. FILTER IN SECONDS
                        23        .
 8000                   24       NGCODE  EQU    08000                   CODE FOR N. G. VALUE IN TABLES
                        25        .
                        26        .**************************************************************
                        27        .*
                        28        .*            PROCESS LORAN DATA EACH SECOND                   *
                        29        .*
                        30        .**************************************************************
                        31        .
 0000+  C000 0000       32       LORANCS PZE    0
 0002+  2C06 0006       33              LTCH6  NS2
 0004+  2670 0362+      34       MODES   LH0    STAMODE,DX,6            UPDATE MODES FOR NEW STATIONS
 0006+  CC03 000A+      35              BNN    *+4
 0008+  FC71 0363+      36              AMH1   STAMODE,X,6
 000A+  0406 0002       37              AH6    2
 000C+  CC04 0004+      38              BN     MODES
 000D+                  39        .
 000E+  2C06 0006       40              LTCH6  NS2                      MARK BINARY VALUES N.G.
 0010+  DE76 041A+      41              STH6   STABIN,DX,6
 0012+  6406 0010+      42              ICBN6  *-2
                        43        .
 0014+  2C06 0006       44              LTCH6  NS2
 0016+  F007 3949       45              RIC7   03949                    PIC 1ST HALFWORD OF DATA
 0018+  CC04 0030+      46              BN     RICB                     GOOD, GO CONVERT
 001A+  FC01 001D+      47              AMH1   RICA+1                   NOT READY
 001C+  2407 0000       48       RICA    LH7   0-0
 001E+  0C07 000A       49              CH7    10
 0020+  CC04 0026+      50              BL     RICX
 0022+  DC01 001AX      51              STH1   ERROR+26                 --- ERROR 1 --- NOT READY
 0024+  DC00 001D+      52              STH0   PICA+1
 0026+  CC07 001F+      53              B      PICX
                        54        .
 0028+  F007 3949       55       RICB    RIC7   03949                   RIC 2ND - 6TH HALFWORDS OF DATA
 002A+  CC04 0032+      56              BN     RICC                     GOOD TRANSFER, O.K.
 002C+  DC01 001AX      57              STH1   ERROR+27                 --- ERROR 2 --- CONTROLLER FAILS
 002E+  CC07 004E+      58              B      RICX
 0030+  DC00 001D+      59       RICB5   STH0   RICA+1
 0032+  DE77 041A+      60       RICC    STH7   STABCD,DX,6
 0034+  2C05 0004       61              LTCH5  4                        CONVERT
 0036+  2401 0000       62              LH1    0                        BCD
 0038+  1C00 000A       63       RICD    MH0    10                         READING
 003A+  7C07 030C       64              RRH7   12                               TO
 003C+  2438 000F       65              LH0    15,C,7                        BINARY
 003E+  0C00 000A       66              CH0    10
 0040+  CC04 0046+      67              BL     RICE
 0042+  DC01 001CX      68              STH1   ERPOR+28                 --- ERROR 3 --- INVALID BCD DIGIT
 0044+  CC07 004C+      69              B      RICF
 0046+  0441 0000       70       RICE    AH1   0,X,0
 0048+  8405 0038+      71              IOBN5  RICD
 004A+  DE71 041A+      72              STH1   STABIN,CX,6              STORE BINARY VALUE
 004C+  8406 0028+      73       RICF    IOBN6  RICB
 004E+                  74       RICX    EVN
                        75        .
 004E+  2407 0000       76       OSINDEX LH7    0-0                     UPDATE TABLE INDEX
 0050+  8407 0054+      77              IOBN7  *+4
 0052+  2C07 0028       78              LTCH7  TABLEN
 0054+  DE07 004F+      79              STH7   OSINDEX+1,0
                        80        .
 0056+  2600 0000X      81              LH0    COSGYRO,0                SET COS(AZ) & SIN(AZ) IN TABLES
 0058+  2601 0000X      82              LH1    SINGYRO,0
 005A+  DE78 04C0+      83              STH0   COSAZ,DX,7
 005C+  DE79 04E8+      84              STH1   SINAZ,DX,7
                        85        .
 005E+  2C06 0006       86              LTCH6  NS2                      SET RANGE CHANGES IN STA. TABLES
 0060+  FC71 043B+      87       RNGA    AMH1   STAMISS,X,6             INC. CNT SINCE LAST GOOD RANGE
 0062+  2673 041A+      88              LH3    STABIN,DX,6
 0064+  CC04 0092+      89              BN     RNGF                     ****************************
 0066+  1C02 2710       90              MH2    10000                    *
 0068+  2671 041B+      91              LH1    STABIN+1,DX,6            *  WARNING: R7 = (OSINDEX+1)  *
 006A+  CC04 00A2+      92              BN     RNGF                     *  THROUGHOUT RNG LOOP.       *
 006C+  0448 0000       93              AH3    0,X,1                    *
 006E+  CC03 0074+      94              BNN    RNGB                     ****************************
 0070+  0403 8000       95              AH3    08000
 0072+  0402 0001       96              AH2    1                        R23 = PRESENT BINARY RANGE
 0074+  2670 0420+      97       RNGB    LH0    STALAST,DX,6
 0076+  2671 0421+      98              LH1    STALAST+1,DX,6           R01 = PREVIOUS BINARY RANGE
 0078+  DE72 0420+      99              STH2   STALAST,DX,6
 007A+  DE73 0421+     100              STH3   STALAST+1,DX,6           SAVE PRESENT RANGE FOR NEXT SECOND
 007C+  F800 0170+     101              BLM    DHSUBSUB                 R01 = RANGE CHANGE (+ TOWARD STAT.)
 007E+  2672 043B+     102              LH2    STAMISS,DX,6             GET TIME SINCE PREVIOUS RANGE (SEC)
 0080+  DC70 043B+     103              STH0   STAMISS,X,6              ZERO SAME (WILL BE 1 NEXT TIME)
 0082+  CC06 0092+     104              BAP    RNGE                     OVERFLOWED, N.G.
 0084+  0C02 0014      105              CH2    20                             IS ELAPSED TIME > 20 SEC ?
 0086+  CC01 00A2+     106              BH     RNGF                               YES, DIFFERENCE IS N.G.
```

TABLE III (cont'd)

```
LORAN3R       LORAN-A/C VELOCITY MODULE                                72/249 11:38:58

LOCN      OBJECT CODE    CARD  1...5...10...15...20...25...30...35...40...45...50...55...60...65...70...

0088+     6400 0000      107             OH0     0
0084+     CC01 009C+     108             BM      RNGD                  TOO LARGE
008C+     7C00 3301      109             SLOH0   1                     ADJUST TO Q29
008E+     3C50 0000      110             DH0     0,X,2                 DIVIDE BY TIME INTERVAL Q15 => Q14
0090+     04C1 0001      111             AH1     .5Q14                 ROUND AVERAGE SPEED (CNTS/SEC,Q14)
0092+     7C01 2301      112             SPH1    1                     ADJUST TO Q15
0094+     0C01 0005      113             CH1     5                     IS VELOCITY EXCESSIVE ?
0096+     CC03 009C+     114             BNL     RNGD                     YES.
0098+     CC01 FFFB      115             CH1     -5                    IS IT TOO SMALL ?
009A+     CC01 009A+     116             BH      RNGF                     NO, IT IS JUST RIGHT.
009C+     2472 0006      117  RNGD       LH2     NS2,X,6
009E+     7C02 2301      118             SRH2    1
00A0+     0C51 0010X     119             STH1    ERROR+29,X,2          --- ERRORS 4 5 6  ---  TOO FAST
00A2+     2401 8000      120  RNGE       LH1     NGCODE                SET VALUE = N.G.
00A4+     0071 035C+     121  RNGF       STH1    STATAB,IX,6           STORE VALUE IN TABLE(R6,R7)
00A6+     0406 0002      122             AH6     2
00A8+     CC04 0040+     123             BN      RNGA
                         124  .
00AA+     2400 0000      125  USMODE     LH0     0-0                   FETCH MODE (0,1,2,3)
00AC+     FC01 00A4+     126             AMH1    USMODE+1              ADVANCE TO NEXT MODE
00AE+     CE47 00B0+     127             B       MODE0123,0X,0         GO TO CODE FOR PRESENT MODE
                         128  .
00B0+     00B4+ 00BC+    129  MODE0123 DC MODE00,MODE10,MODE20,MODE30
00B2+     00B8+ 00BE+

130  .
                         131  .       MODE = 0 -- COMPUTE AZ(STA-A) & AZ(STA-B)
                         132  .
00B4+     2C06 0006      133  MODE00     LTCH6   6                     SET INDEX FOR STA-A
00B6+     F800 017C+     134             BLM     AZIMUTH
00B8+     2C06 0004      135             LTCH6   4                     SET INDEX FOR STA-B
00BA+     F800 017C+     136             BLM     AZIMUTH
00BC+     CC07 014C+     137             B       ERR                   EXIT, MODE 0 COMPLETE
                         138  .
                         139  .       MODE = 1 -- COMPUTE AZ(STA-C) & FIRST 1/4 OF FIT
                         140  .
00BE+     2C06 0002      141  MODE10     LTCH6   2                     SET INDEX FOR STA-C
00C0+     F800 017C+     142             BLM     AZIMUTH
00C2+     0C00 00F3+     143             STH0    SUME+1                ZERO COUNT OF USED RANGE RATES
00C4+     2C07 000A      144             LTCH7   10
00C6+     0C78 04F8+     145             STH0    SUMS+10,X,7           ZERO L. S. SUMMATIONS
00C8+     8407 00C6+     146             ICHN7   *-2
00CA+     2607 009F+     147             LH7     OSINDEX+1,0           INITIALIZE RANGE RATE INDEX
00CC+     0E07 0100+     148             STH7    SVINDEX+1,0
00CE+     2400 3C00      149             LH0     TABLEN*308            INITIALIZE WEIGHTING FACTOR
00D0+     0E00 0262+     150             STH0    WEIGHT,0
00D2+     2C00 000A      151             LTCH0   TABLEN/4              FETCH NO OF TERMS TO DO THIS TIME
00D4+     F800 01C6+     152             BLM     FIT                   GO DO PART OF FIT
00D6+     CC07 014C+     153             B       ERR
                         154  .
                         155  .       MODE = 2 -- COMPUTE MIDDLE 1/2 OF FIT SUMMATIONS
                         156  .
00D8+     2C00 0014      157  MODE20     LTCH0   TABLEN/2              FETCH NO. OF TERMS TO DO THIS TIME
00DA+     F800 01C6+     158             BLM     FIT
00DC+     CC07 014C+     159             B       ERR
                         160  .
                         161  .       MODE = 3 -- COMPUTE LAST 1/4 OF SUMMATIONS & SOLVE FOR VA & VC
                         162  .
00DE+     2C00 000A      163  MODE30     LTCH0   TABLEN-TABLEN/2-TABLEN/4  SET TO DO REST OF TERMS
00E0+     F800 01C6+     164             BLM     FIT
                         165  .
                         166  .
00E2+     2400 0000      167  SUME       LH0     0-0                   CHECK NUMBER OF ENTRIES USED
00E4+     0C00 000A      168             CH0     10
00E6+     CC03 00F0+     169             BNL     SUMF
00E8+     0C01 0020X     170             STH1    ERROR+32              --- ERROR 7 --- NOT ENOUGH DATA
00EA+     0C00 03EA+     171             STH0    LORANVEL+2            MARK "NO LORAN VELOCITIES"
00EC+     0C00 03E8+     172             STH0    LORANVEL+3
00EE+     CC07 014C+     173             B       ERR
                         174  .
00F0+     E2C0 0000X     175  SUMF       XSH     OH1,0                 SOLVE FOR VA & VC (CNTS/SEC,Q3)
00F2+     F203 04F4+     176             LF3     SUMS+6,0              R0 = CS,  R2 = SS
00F4+     1900 0000      177             M0      0,P                   R0 = CS*CS Q12
00F6+     1402 04F0+     178             M2      SUMS+2,0              R2 = CC*SS Q12
00F8+     6302 0000      179             S2      0,P                   R2 = DETERMINANT Q12
00FA+     0A02 04E8+     180             ST2     USWORK,0
                         181  .
00FC+     8207 04FC+     182             LF7     SUMS,0                R0=RC, R2=CC, R4=RS, R6=CS
00FE+     1400 04F6+     183             M0      SUMS+8,0              R0 = RC*SS Q15
0100+     1402 04F2+     184             M2      SUMS+4,0              R2 = CC*RS Q15
0102+     1404 04F4+     185             M4      SUMS+6,0              R4 = RS*CS Q15
0104+     1406 04FC+     186             M6      SUMS,0                R6 = CS*RC Q15
0106+     6300 0004      187             S0      4,P                   R0 = RC*SS - RS*CS
0108+     6302 0006      188             S2      6,P                   R2 = RS*CC - RC*CS
010A+     3AC0 04E8+     189             D0      USWORK,0              R0 = VA (CNTS/SEC,Q3)
010C+     3AC2 04E8+     190             D2      USWORK,0              R2 = VC (CNTS/SEC,Q3)
010E+     0E00 04EA+     191             STH0    USWORK+2,0
0110+     0E02 04E8+     192             STH2    USWORK+3,0
                         193  .
0112+     2C06 0002      194             LTCH6   2                     CONVERT TO (CKT,Q11) & QC SIZE
0114+     0C71 03FC+     195  VAVC010    STH1    LORANVEL+4,X,6        MARK LORAN VELOCITY GOOD
0116+     2671 04FC+     196             LH1     USWORK+4,0X,6         FETCH VA/VC (CNTS/SEC,Q3)
0118+     1C00 0000      197  LORANFAC   MH0     0-0                   *(CKT-SEC/CNT,Q13) => (CKT,Q13)
011A+     0C71 0162+     198             CH0     VAVCMAX+2,0X,6        DOES VA/VC EXCEED UPPER BOUND ?
011C+     CC01 0122+     199             BH      VAVC020                  YES, GO FLAG ERROR & NO-GOOD
011E+     0C71 0164+     200             CH0     VAVCMIN+2,0X,6        DOES VA/VC EXCEED LOWER LIMIT ?
0120+     CC03 0126+     201             BNL     VAVC030                  NO, GO PROCESS VA/VC SOME MORE
0122+     0C71 0023X     202  VAVC020    STH1    ERROR+35,X,6          --- ERROR 8 9 --- VA/VC N.G.
0124+     CC07 014C+     203             B       VAVC050               GO MARK VA/VC NO GOOD
0126+     7C00 3B02      204  VAVC030    SLOH0   13-11                 ADJUST TO (CKT,Q11)
0128+     2003 0140+     205             LH3     ERR+1,0               IS IT EARLY IN THE RUN ?
012A+     CC04 0134+     206             BN      VAVC040                  YES, GO START UP FILTER
012C+     2402 0000      207  LORANFIL   LH2     0-0
012E+     2C53 03FC+     208             LH3     FILTER,0X,2           FETCH TIME CONSTANT (-SIC,Q13)
0130+     CC05 0134+     209             BNP     VAVC040               TC = 0 => DO NOT FILTER
0132+     8670 03F0+     210             S40     VAVCSM+2,0X,6         GET (RA=-OLD SMOOTHED)
0134+     7C00 3B0C      211             SROH0   23-11                 ADJUST TO (CKT,Q23)
```

TABLE III (cont'd)

```
LORAN3R        LORAN-A/C VELOCITY MODULE                                              72/249 11:38:58

LOCN    OBJECT CODE   CARD   1...5...10...15...20...25...30...35...40...45...50...55...60...65...70...

0136+   3C56  0000    212            DHO    0,X,3              Q23 / Q13 => Q10
0138+   2448  0001    213            LHO    1,X,1              ROUND RESULT
013A+   7C00  2401    214            SRHO   11-10              ADJUST TO Q11
013C+   0570  03F0+   215            AHO    VAVCSN+2,0X,6      S(N) = (R(N)-S(N-1))/TC + S(N-1)
013E+   0E70  03F0+   216   VAVC040  STHO   VAVCSN+2,0X,6      SAVE S(N) (NEXT TIME IT IS S(N-1))
0140+   0E70  03F4+   217            STHO   LORANVEL+2,0X,6    STORE VA/VC FOR NAVIGATION
0142+   2402  0000    218   LORANINH LH2    0-0                IS LORAN INHIBITED ?
0144+   CC02  0143+   219            BZ     VAVC060            NO, LEAVE GOOD VA/VC; DO NEXT
0146+   0C70  03EC+   220   VAVC050  STHO   LORANVEL+4,X,6     MARK LORAN VA/VC NO GOOD
0148+   8406  0114+   221   VAVC060  ICBN6  VAVC010            REPEAT FOR VC AFTER VA
                      222    .
                      223    .
0120+                 224   CIRCFLAG EQU    LORANFIL+1
                      225   .
014A+   DC00  00AB+   226            STHO   OSMODE+1           RECYCLE MODE ( 0 FOLLOWS 3)
                      227    .
                      228    .
014C+   2400  0000    229   ERR      LH0    0-0                IS RUN JUST STARTED ?
014E+   CC03  0154+   230            BNN    ERRA               START-UP COMPLETE, GO CK IF LORAN INH
0150+   FC01  0149+   231            ANH1   FRR+1              START-UP IN PROGRESS, MARK TIME
0152+   CC07  0158+   232            B      ERRB               GO CLEAR ERROR MSG FLAGS FOR LORAN
0154+   2400  0143+   233   ERRA     LH0    LORANINH+1,0       IS LORAN INHIBITED ?
0156+   CC02  015F+   234            BZ     ERRX               NO, ALLOW ERR MSGS TO STAND
0158+   2C00  0000    235   ERRB     LTCH0  9
015A+   0C40  0023X   236            STHO   ERROR+35,X,0       SUPPRESS LORAN ERRORS 1-9
015C+   8400  015A+   237            ICBN0  *-2
015E+                 238   ERRX     EVN
                      239    .
015F+   CE07  0000+   240            B      LORANOS,D          EXIT ONE-SEC LORAN PROCESSING
                      241    .
                      242    .
0160+   1F40  0C80    243   VAVCMAX  DC     2000013,800013     (CKT,Q13) UPPER LIMITS
                      244   .
0162+   F830  F380    245   VAVCMIN  DC     -500013,-800013    (CKT,Q13) LOWER LIMITS
                      246   .
                      247   .
0164+   0000  0000    248   DHADDSUB PZE    0
0166+   0E06  0160+   249            STH6   DHADDREG+1,0
0168+   2406  016C+   250            LH6    DHADDREG
016A+   CC07  0000X   251            B      DHADD
016C+   2406  0000    252   DHADDREG LH6    0-0
016E+   CE07  0164+   253            B      DHADDSUB,D
                      254   .
                      255   .
0170+   0000  0000    256   DHSUBSUB PZE    0
0172+   0E06  0170+   257            STH6   DHSUBREG+1,0
0174+   2406  017A+   258            LH6    DHSUBREG
0176+   CC07  0000X   259            B      DHSUB
0178+   2406  0000    260   DHSUBREG LH6    0-0
017A+   CE07  0170+   261            B      DHSUBSUB,D
                      262   .
                      263   .
                      264   .*****************************************************************
                      265   .*
                      266   .*       SUBROUTINE TO COMPUTE COS(AZ) & SIN(AZ) OF STATION (R6)   *
                      267   .*
                      268   .*       MEASURED CLOCKWISE FROM NORTH AS SEEN FROM THE SHIP.      *
                      269   .*
                      270   .*****************************************************************
                      271   .
017C+   0000  0000    272   AZIMUTH  PZE    0
017E+   F2C0  0000X   273            XSW    DHI,0
0180+   2270  03FC+   274            LC     STALON,DX,6
0182+   6ACC  0000X   275            SO     LON,0              *R0 = LN = LN2 - LN1
0184+   A102  0000    276            COS2   0,R                R2 = CLN
0185+   A500  0000    277            SIN0   0,R                R0 = SLN
0188+   A274  03F6+   278            COS4   STALAT,DX,6        R4 = C2
018A+   1900  0004    279            M0     4,R                R0 = C2*SLN = V
018C+   1902  0004    280            M2     4,R                R2 = C2*CLN
018E+   A6C4  0000X   281            SIN4   LAT,0              R4 = S1
0190+   1902  0004    282            M2     4,R                R2 = S1*C2*CLN
0192+   DA02  04F8+   283            ST2    OSWORK,0
0194+   A202  0000X   284            COS2   LAT,0              R2 = C1
0196+   A674  03F6+   285            SIN4   STALAT,DX,6        R4 = S2
0198+   1902  0004    286            M2     4,R                R2 = C1*S2
019A+   6A02  04F8+   287            S2     OSWORK,0           R2 = C1*S2 - S1*C2*CLN = U
019C+   2CC7  0320    288            LTCH7  32
019E+   0C00  2000    289   AZNA     CH0    02000              NORMALIZE R01 (V) & R23 (U)
01A0+   CC03  01A6+   290            BNL    AZNB
01A2+   0C02  F000    291            CH0    0E000
01A4+   CC06  01A6+   292            BNH    AZNB
01A6+   0C02  2000    293            CH2    02000
01A8+   CC03  01A6+   294            BNL    AZNB
01AA+   CC02  F000    295            CH2    0E000
01AC+   CC06  01A6+   296            BNH    AZNB
01AE+   7C00  8001    297            SLOH0  1
01B0+   7CC2  8001    298            SLOH2  1
01B2+   9407  019E+   299            ICBN7  AZNA
01B4+   2402  4000    300            LH2    04000              SET FOR ZERO RANGE 360 AZIMUTH
01B6+   F2C0  0000X   301   AZNB     XSW    DHI,0
01B8+   6A03  04F8+   302            STF3   OSWORK,0
01BA+   1900  0000    303            M0     0,R                R0 = V*V
01BC+   1902  0002    304            M2     2,R                R2 = U*U
01BE+   C100  0002    305            A0     2,R                R0 = U*U + V*V
01C0+   A904  0000    306            SQRT4  0,R                R4 = SQRT(U*U+V*V)
01C2+   B203  04F8+   307            LF3    OSWORK,0           R0 = V,  R2 = U
01C4+   3700  0004    308            D0     4,R                R0 = SIN(AZ)
01C6+   3902  0004    309            D2     4,R                R2 = COS(AZ)
01C8+   0E70  0403+   310            STH0   STASINA,DX,6       STORE SIN(AZ(STA)),
01CA+   0E72  0402+   311            STH2   STACOSA,DX,6              COS(AZ(STA)), AND
01CC+   CE07  017C+   312            B      AZIMUTH,D
```

TABLE III (cont'd)

```
LORAN3R      LORAN-A/C VELOCITY MODULE                                    72/249 11:38:58

LOCN    OBJECT CODE    CARD   1...5...10...15...20...25...30...35...40...45...50...55...60...65...70...
                       314   .
                       315   .*******************************************************************
                       316   .*                                                                 *
                       317   .*        SUBROUTINE TO COMPUTE THE SUMMATIONS REQUIRED TO MAKE    *
                       318   .*                                                                 *
                       319   .*        THE LEAST MEAN SQUARES ESTIMATION OF VA & VC.            *
                       320   .*                                                                 *
                       321   .*******************************************************************
                       322   .
01CE+   0000   0000    323  FIT      PZE     0
0100+   0E00   0107+   324           STH0    SUMC+1,0           SET NO. OF TERMS TO DO THIS SECOND
0102+   2407   0000    325  SVINDEX  LH7     0-0                FETCH INDEX OF NEXT TERM TO DO
0104+   2C06   0006    326  SUMA     LTCH6   NS2                SET STA. INDEX
0106+   2400   0000    327  SUMB     LH0     0-0                IS THIS SECOND'S WORK DONE
0108+   CC03   025F+   328           BNN     SUMD                  YES, SAVE INDEX & EXIT
010A+   2600   00F3+   329           LH0     SUMC+1,0           FETCH NO. OF GOOD TERMS SO FAR
010C+   0C00   0064    330           CH0     100                ARE ENOUGH GOOD TERMS ALREADY DONE ?
010E+   CC03   024A+   331           BNL     SUMC                  YES, SKIP ACCUMULATION
0110+   2600   0109+   332           LH0     MESOFF+8,0         IS THIS STATION NOT TO BE USED ?
01F2+   0F70   03A3+   333           CH0     STAID,DX,6
01F4+   CC02   024A+   334           BE      SUMC
01F6+   2670   0362+   335           LH0     STAMODE,DX,6       IS THIS STATION JUST COME ON ?
01F8+   CC05   024A+   336           BNZ     SUMC
01FA+   2570   035C+   337           LH0     STATAB,IX,6        GET TABLE SPEED ENTRY(R6,R7)
01CC+   0C00   9000    338           CH0     NGCODE             IS VALUE VALID OR IS VALUE = N.G. ?
01EE+   CC02   024A+   339           BE      SUMC
01F0+   FC01   0003+   340           AMH1    SUMB+1             INCREMENT SUM OF VALUES USED
01F2+   7C00   A009    341           SLH0    15-6               ADJUST VALUE TO Q6
01F4+   C670   040F+   342           AH0     STADRF,DX,6        ADD IN DRIFT RATE (CT/SEC,Q6)
01F6+   0F00   04F9+   343           STH0    0SWORK,0           SET R(CT/SEC,Q6)
01F8+   0C00   04F9+   344           STH0    USWORK+1
01FA+   2679   0400+   345           LH1     COSAZ,DX,7
01FC+   1F70   0402+   346           MH0     STACOSA,DX,6
01FE+   7C00   3801    347           SRDH0   1
0200+   267A   04E8+   348           LH3     SINAZ,DX,7
0202+   1F72   0403+   349           MH2     STASINA,DX,6
0204+   7C02   3801    350           SRDH2   1
0206+   F000   0164+   351           BLM     OHADDSUB           R0 = CS*CG+SS*SG = COS(A-G)
0208+   7C00   3802    352           SRDH0   2                  ADJUST TO Q3
020A+   0E00   04EA+   353           STH0    0SWORK+2,0         SET C (--,Q3)
020C+   0E01   04E4+   354           STH1    0SWORK+3,0
020E+   2671   0403+   355           LH1     STASINA,DX,6
0210+   1F73   04C0+   356           MH0     COSAZ,DX,7
0212+   7C00   3801    357           SRDH0   1
0214+   2673   0402+   358           LH3     STACOSA,DX,6
0216+   1F7A   04E8+   359           MH2     SINAZ,DX,7
0218+   7C02   3301    360           SRDH2   1
021A+   F800   0171+   361           BLM     OHSUBSUB           R0 = SS*CG-CS*SG = SIN(A-G)
021C+   7C00   3102    362           SRDH0   2                  ADJUST TO Q3
021E+   0F00   04EC+   363           STH0    0SWORK+4,0         SET S (--,Q3)
0220+   0E01   04E0+   364           STH1    0SWORK+5,0
                       365  .
0222+   F200   0000X   366           XSW     0H1,0
0224+   8203   04F9+   367           LF3     OSWORK,0
0226+   1A00   04FA+   368           M0      0SWORK+2,0         RC = R*C Q9
0228+   1A00   0262+   369           M0      WEIGHT,0
022A+   1302   04FA+   370           M2      0SWORK+2,0         R2 = C*C Q6
022C+   1A02   0262+   371           M2      WEIGHT,0
022E+   0200   04EE+   372           A0      SUMS,0
0230+   0202   04F0+   373           A2      SUMS+2,0
0232+   BA03   04EE+   374           STF3    SUMS,0
0234+   8205   04E8+   375           LF5     OSWORK,0
0236+   1A00   04EC+   376           M0      0SWORK+4,0         R0 = R*S Q9
0238+   1A00   0262+   377           M0      WEIGHT,0
023A+   1A02   04FC+   378           M2      0SWORK+4,0         R2 = C*S Q6
023C+   1A02   0262+   379           M2      WEIGHT,0
023E+   1A04   04FC+   380           M4      0SWORK+4,0         R4 = S*S Q6
0240+   1A04   0262+   381           M4      WEIGHT,0
0242+   0200   04F2+   382           A0      SUMS+4,0
0244+   0202   04F4+   383           A2      SUMS+6,0
0246+   0204   04F5+   384           A4      SUMS+3,0
0248+   BA05   04F2+   385           STF5    SUMS+4,0
                       386  .
024A+   0406   0002    387  SUMC     AH6     2                  ADVANCE TO NEXT STA
024C+   CC04   0106+   388           BN      SUMB               REPEAT FOR NEXT STA & SAME TIME
024E+   FC01   0107+   389           AMH1    SUMB+1             INCREMENT COUNT OF TERMS EXAMINED
0250+   2CC0   0100    390           LTCH0   308                ADJUST WEIGHTING FACTOR
0252+   F600   0262+   391           AMH0    WEIGHT,0
0254+   6C07   0001    392           SH7     1                  ADVANCE TO NEXT TIME
0256+   247E   0023    393           LH6     TABLEN,X,7         CHECK FOR WRAP-AROUND OF INDEX
0258+   CC03   025C+   394           BNN     *+4
025A+   2CC7   0001    395           LTCH7   1                  RESET INDEX TO WRAP-AROUND
025C+   CC07   0104+   396           B       SUMA               GO BACK FOR NEXT INDEX VALUE
                       397  .
025E+   DF07   0103+   398  SUMD     STH7    SVINDEX+1,0        SAVE TIME INDEX FOR NEXT SECOND
0260+   CE07   01CE+   399           B       FIT,0              EXIT FIT ROUTINE
                       400  .
0262+   0000   0000    401  WEIGHT   DC      0,0                WEIGHTING FACTOR FOR L. S.
```

Having described the invention in connection with certain specific embodiments thereof, it is to be understood that further modifications may now suggest themselves to those skilled in the art and it is intended to cover such modifications as fall within the scope of the appended claims.

What is claimed is:

1. In an integrated satellite navigation system where satellite fixes periodically establish the position of a ship plying a course within the range of a chain of radio ranging stations and wherein ship velocities must be accurately determined in the interval between satellite fixes in order to chart said course, the combination which comprises:

means for measuring difference values between successive RF signal transit times for each of a plurality of said stations, means to store a set of functions, one for each of said stations, dependent upon said difference values for transit times related to each said station, means to update each said set with new difference values for each said station while discarding the most aged of said functions in the corresponding set, and a least mean squares generator utilizing said sets periodically to generate velocity signals representative of the motion of said ship.

2. The combination set forth in claim 1 wherein weighting means are provided to modify said set of functions to weight the most recent function greater than the most aged function.

3. The combination set forth in claim 2 wherein said weighting means is linear.

4. The combination set forth in claim 1 wherein control means sample said transit times at a high rate and said generator produces said velocity signals at a lower rate.

5. The combination set forth in claim 4 wherein said control means operates at said high rate of the order of four times said lower rate.

6. A system for determining ship velocity from radio ranging signals which comprises:
   a. means for generating successive radio range signals at a selected rate, each representative of the radio range between said ship and one of at least two fixed base stations,
   b. signal process means for comparing each range signal from each base station with its next preceding signal to determine a difference signal,
   c. means for storing a predetermined number of ship velocity related functions each dependent upon one of a like number of the most recent of said signals, and
   d. processor means for generating output signals representative of ship velocity utilizing sets of said stored functions whose difference signal is below a limit indicative of a predetermined change in ship velocity in the interval between successive range signals.

7. A system for aiding in navigation of a marine vessel in reach of a plurality of base radio ranging stations which comprises:
   a. a radio ranging mobile station means on said vessel for generating at least two sets of radio range signals, one set for each of two base stations with each set comprising a real time series of N successive signals,
   b. comparison means connected to receive and compare each signal in each series with its next preceding signal to generate difference signals, and
   c. processing means operating on sets of said N range signals while excluding any range signal for which said difference signal exceeds a preset limit to generate signals representative of velocity of said vessel.

8. A system for determining ship velocity from radio ranging signals which comprises:
   a. means for generating successive radio range signals at a selected rate, each representative of the radio range between said ship and one of at least two fixed base stations,
   b. means to store and compare the two most recent of said range signals for each said base station to produce difference signals,
   c. means for storing a predetermined number of ship velocity related functions each dependent upon one of a like number of the most recent of said signals, and
   d. means for generating output signals representative of ship velocity utilizing said stored functions while excluding any stored function whose related difference function exceeds a predetermined limit.

9. In an integrated satellite navigation system where satellite fixes periodically establish the position of a ship plying a course within the range of a chain of radio ranging stations and wherein ship velocities must be accurately determined in the interval between satellite fixes in order to chart said course, the method which comprises:
   a. establishing difference values between successive RF signal transit times for each of a plurality of said stations,
   b. for each of said stations storing a set of functions dependent upon successive difference values between transit times related to each said station while retaining the most recent function and discarding the most aged function in the corresponding set, and
   c. periodically generating velocity signals representative of the motion of said ship by a least mean squares utilization of said sets.

10. In an integrated satellite navigation system where satellite fixes periodically establish the position of a ship plying a course within the range of a chain of radio ranging stations and wherein ship velocities must be accurately determined in the interval between satellite fixes in order to chart said course, the method which comprises:
    a. establishing difference signals representative of the differences between transit times of successive Loran transmissions between said ship and each of a plurality of said stations,
    b. for each of said stations storing a set of functions dependent upon the difference signals related to each said station while retaining the most recent function and discarding the most aged function in the corresponding set, and
    c. periodically generating velocity signals representative of the motion of said ship by a least mean squares utilization of said sets.

11. The method of claim 10 wherein the ship-station transit time is sampled at a high rate and velocity signals are generated at a low rate.

12. The method of claim 10 in which a ship-station transit time is sampled each second and velocity signals are generated each four second interval.

13. The method of claim 10 in which each said set of elements are of the order of 40 in number and whereby said velocity signals each reflects 40 samples, one per second, on a least mean square utilization of Loran transit time differences.

14. In determining ship velocity from radio ranging signals the method which comprises:
    a. generating successive radio range signals at a selected rate, each representative of the radio range between said ship and one of at least two fixed base stations,
    b. for each base station comparing each range signal therefrom with its next preceding signal to determine difference signal, c. for each said station storing a predetermined number of ship velocity related functions each dependent upon one of a like number of the most recent of said signals, and d. generating output signals representative of ship velocity utilizing said stored functions while excluding any stored function whose related difference signal is of magnitude to indicate a predetermined excessive change in ship velocity in the interval between generation of range signals.

15. In navigating a marine vessel in reach of a plurality of base radio ranging stations the method which comprises:

a. generating at said vessel at least two sets of radio range signals, one set for each of two base stations with each set comprising a real time series of N successive signals, b. comparing each signal in each series with its next preceding signal to generate difference signals, and c. generating signals representative of vessel velocity utilizing sets of said N range signals while excluding any range signal for which said difference signal exceeds a predetermined limit.

16. The method of claim 15 in which signals representative of bearings from said vessel to each said base station are generated and employed in generation of said velocity signals.

17. The method of claim 15 in which N is of the order of 40.

* * * * *